United States Patent
Chauvin et al.

(10) Patent No.: US 10,419,645 B2
(45) Date of Patent: Sep. 17, 2019

(54) DYNAMIC COLOR MATCHING BETWEEN PRINTERS AND PRINT JOBS

(71) Applicants: James Anthony Chauvin, Frederick, CO (US); Larry M Ernst, Longmont, CO (US); Jo S. Kirkenaer, Broomfield, CO (US)

(72) Inventors: James Anthony Chauvin, Frederick, CO (US); Larry M Ernst, Longmont, CO (US); Jo S. Kirkenaer, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/900,734

(22) Filed: Feb. 20, 2018

(65) Prior Publication Data
US 2019/0258437 A1    Aug. 22, 2019

(51) Int. Cl.
*H04N 1/60*    (2006.01)
*G06F 3/12*    (2006.01)

(52) U.S. Cl.
CPC .......... *H04N 1/603* (2013.01); *G06F 3/1219* (2013.01); *G06F 3/1288* (2013.01); *H04N 1/6052* (2013.01)

(58) Field of Classification Search
CPC .... H04N 1/6052; H04N 1/603; H04N 1/6058; H04N 1/6061; H04N 1/6063; H04N 1/6066
See application file for complete search history.

(56) References Cited

U.S. PATENT DOCUMENTS

| | | | | |
|---|---|---|---|---|
| 5,287,122 A | * | 2/1994 | Vachon | H04N 1/6027 347/172 |
| 6,041,136 A | * | 3/2000 | Ohga | H04N 1/6058 382/162 |
| 6,549,654 B1 | * | 4/2003 | Kumada | G06K 15/02 345/590 |

(Continued)

FOREIGN PATENT DOCUMENTS

| | | | | |
|---|---|---|---|---|
| CN | 101453548 B | | 1/2012 | |
| JP | 2008171268 A | * | 7/2008 | ............. H04N 1/603 |

(Continued)

OTHER PUBLICATIONS

Color Difference; Wikipedia; Jan. 22, 2018.

*Primary Examiner* — Ted W Barnes
(74) *Attorney, Agent, or Firm* — Duft & Bornsen, PC

(57) ABSTRACT

Systems and methods are provided for selectively qualifying printers for printing incoming jobs, based on an amount of colors within the job that the printers can reproduce. One embodiment is a system that includes an interface and a memory storing a print job defined in a job color space. The system also includes a controller that identifies colors specified by print data in the print job, determines coordinates of the colors in a perceptual color space, selects a printer, determines boundaries of a color gamut of the printer in the perceptual color space, and determines an amount of the colors that the printer is capable of reproducing. When the amount is greater than a threshold, the controller qualifies the printer for printing the print job. When the amount is less than the threshold, the controller disqualifies the printer from printing the print job.

17 Claims, 7 Drawing Sheets

(56) References Cited

U.S. PATENT DOCUMENTS

| | | | |
|---|---|---|---|
| 6,563,944 B1* | 5/2003 | Kumada | G06F 3/1204 358/1.15 |
| 6,724,507 B1* | 4/2004 | Ikegami | H04N 1/6058 358/501 |
| 7,227,666 B1* | 6/2007 | MacLeod | H04N 1/603 358/1.9 |
| 7,355,745 B2* | 4/2008 | Hudson | H04N 1/603 345/589 |
| 7,463,385 B2 | 12/2008 | Gondak et al. | |
| 8,054,505 B2 | 11/2011 | Mestha et al. | |
| 8,290,258 B1* | 10/2012 | Polonsky | H04N 1/6027 345/690 |
| 8,373,894 B2* | 2/2013 | Robinson | H04N 1/00413 358/1.9 |
| 8,717,620 B2* | 5/2014 | Sawada | G06F 3/1208 358/1.13 |
| 8,955,940 B1 | 2/2015 | Smith et al. | |
| 9,030,710 B2 | 5/2015 | Nakamura | |
| 9,247,107 B2* | 1/2016 | Imaseki | H04N 1/6033 |
| 2002/0149786 A1* | 10/2002 | Hudson | H04N 1/603 358/1.9 |
| 2003/0117457 A1* | 6/2003 | Qiao | H04N 1/6058 347/43 |
| 2005/0036159 A1* | 2/2005 | Sharma | H04N 1/603 358/1.9 |
| 2006/0126133 A1* | 6/2006 | Marquez | H04N 1/6052 358/504 |
| 2007/0097389 A1* | 5/2007 | Morovic | H04N 1/6033 358/1.9 |
| 2007/0263237 A1* | 11/2007 | Robinson | H04N 1/00413 358/1.9 |
| 2008/0007806 A1* | 1/2008 | Shirasawa | H04N 1/6058 358/520 |
| 2008/0180704 A1* | 7/2008 | Kametani | H04N 1/603 358/1.9 |
| 2008/0204829 A1* | 8/2008 | Harrington | H04N 1/6058 358/504 |
| 2009/0161125 A1* | 6/2009 | Mestha | H04N 1/6058 358/1.9 |
| 2009/0310152 A1* | 12/2009 | Roulland | H04N 1/603 358/1.9 |
| 2010/0097622 A1* | 4/2010 | Qiao | H04N 1/6058 358/1.9 |
| 2010/0302271 A1* | 12/2010 | Sloan | G09G 5/04 345/590 |
| 2011/0304866 A1* | 12/2011 | Sawada | G06F 3/1208 358/1.9 |
| 2013/0050245 A1* | 2/2013 | Longhurst | H04N 9/67 345/590 |
| 2013/0194321 A1* | 8/2013 | Wan | H04N 1/46 345/690 |
| 2015/0339552 A1* | 11/2015 | Deshpande | G06K 15/1867 358/1.9 |
| 2017/0171432 A1* | 6/2017 | Qiao | H04N 1/603 |
| 2019/0037111 A1* | 1/2019 | Ezoe | H04N 1/6061 |

FOREIGN PATENT DOCUMENTS

| | | |
|---|---|---|
| JP | 201011046 | 1/2010 |
| JP | 2010011046 A * | 1/2010 |

* cited by examiner

COLOR TABLE

| PJ COLOR SPACE COORD | PERCEPT COLOR SPACE COORD | PCT OF JOB | REPRODUCIBLE? |
|---|---|---|---|
| (0, 0, 0, 0) | (0, 0, 0) | 75 | Y |
| (0.2, 0.2, 0.2, 0.2) | (67, 0.004, -0.007) | 2 | Y |
| (0.8, 0.2, 0.2, 0.2) | (61, 31.7, -9.5) | 0.6 | Y |
| (0.3, 0.1, 0.41, 0.9) | (6.9, -3.9, 3.9) | 0.3 | Y |
| (0.3, 0.1, 1, 0.9) | (6.7, -6.1, 9.9) | 0.06 | N |
| (0.3, 0.6, 1, 0) | (50.7, 25, 58.6) | 0.04 | Y |

US 10,419,645 B2

DYNAMIC COLOR MATCHING BETWEEN PRINTERS AND PRINT JOBS

FIELD OF THE INVENTION

The invention relates to the field of printing, and in particular, to print job processing.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

Different print jobs may be defined in different color spaces. Each color space covers a predefined range of colors defined by Red, Green, and Blue colors (RGB), defined by Cyan, Magenta, Yellow and Registration Black colors, (CMYK), or other coordinate systems. Some print jobs may be defined in complex color spaces that define millions or billions of colors, while other print jobs may be defined in less complex color spaces. If a printer is incapable of handling the full range of colors defined by a color space indicated by a print job, then a more advanced printer may be used, such as a proofing printer.

However, printers having advanced capabilities are more expensive to operate than other printers within a print shop. Thus, print shop operators continue to seek out techniques for reducing operating costs within the print shop when handling print jobs with complex color requirements.

SUMMARY

Embodiments described herein dynamically determine whether a printer is capable of accurately reproducing the colors specifically called out by a print job, regardless of whether the printer supports the entire color space that the print job is defined in. This advantageously enables a print shop operator to utilize printers that are less expensive to print incoming jobs, even when those jobs use color spaces that would normally be expected for printing on more expensive printers. In short, instead of comparing entire color spaces when determining interoperability between print jobs and printers, the systems and methods described herein determine interoperability on a color-by-color basis for colors within the print job.

One embodiment is a system that includes an interface and a memory storing a print job defined in a job color space. The system also includes a controller that identifies colors specified by print data in the print job, determines coordinates of the colors in a perceptual color space, selects a printer, determines boundaries of a color gamut of the printer in the perceptual color space, and determines an amount of the colors that the printer is capable of reproducing. When the amount is greater than a threshold, the controller qualifies the printer for printing the print job. When the amount is less than the threshold, the controller disqualifies the printer from printing the print job.

A further embodiment is a method. The method includes loading a print job defined in a job color space, identifying colors specified by print data in the print job, and determining coordinates of the colors in a perceptual color space. The method also comprises selecting a printer, determining boundaries of a color gamut of the printer in the perceptual color space, determining an amount of the colors that the printer is capable of reproducing, and determining whether the amount is greater than the threshold. The method further comprises qualifying the printer for printing the print job when the amount is greater than a threshold, and disqualifying the printer from printing the print job when the amount is less than the threshold.

A further embodiment is a non-transitory computer readable medium embodying programmed instructions which, when executed by a processor, are operable for performing a method. The method includes loading a print job defined in a job color space, identifying colors specified by print data in the print job, and determining coordinates of the colors in a perceptual color space. The method also comprises selecting a printer, determining boundaries of a color gamut of the printer in the perceptual color space, determining an amount of the colors that the printer is capable of reproducing, and determining whether the amount is greater than the threshold. The method further comprises qualifying the printer for printing the print job when the amount is greater than a threshold, and disqualifying the printer from printing the print job when the amount is less than the threshold.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
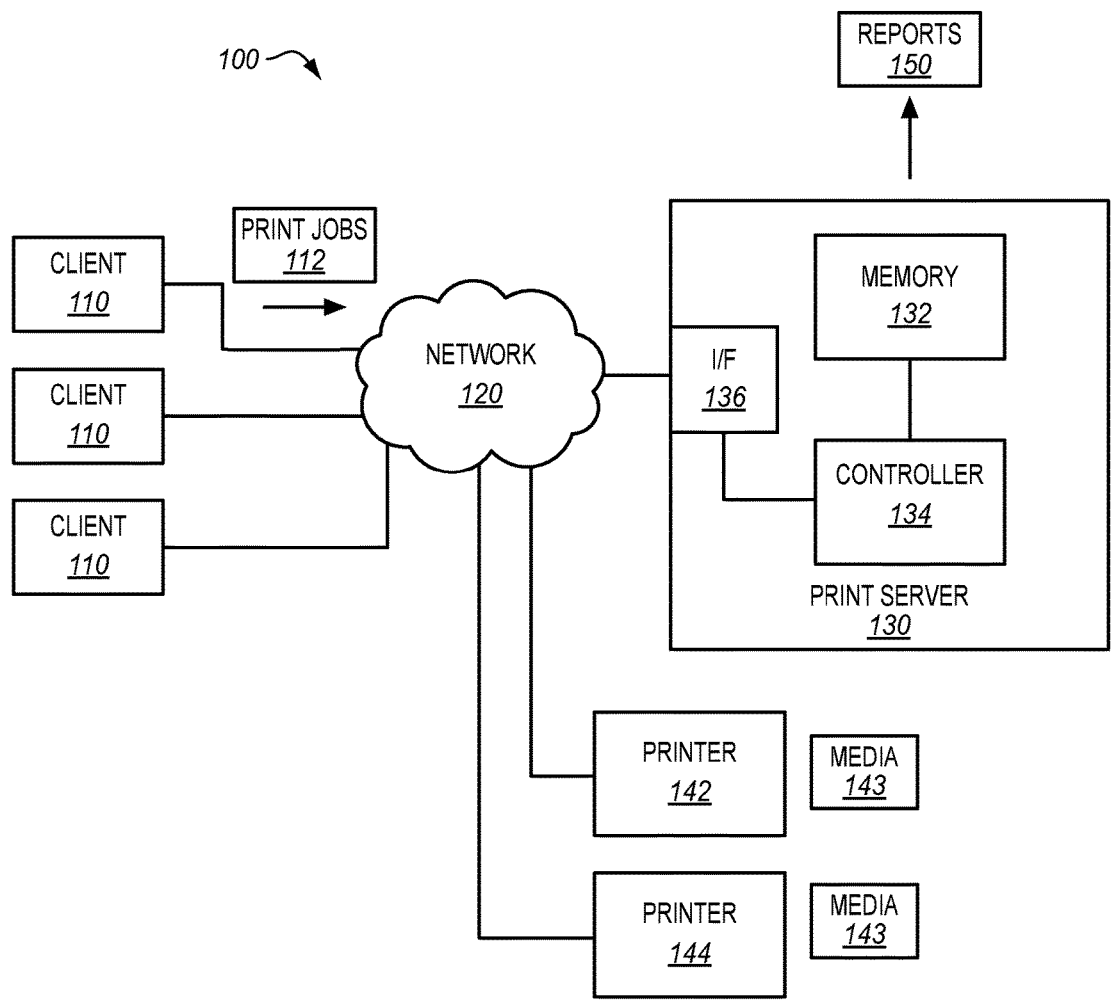
FIG. 1 is a block diagram of a printing system in an illustrative embodiment.

FIG. 1 is a block diagram of a printing system 100 in an illustrative embodiment. Printing system 100 comprises any system, device, or component operable to generate physically printed documents based on incoming print data. In this embodiment, printing system 100 includes print server 130, which receives print jobs from clients 110 at an interface (i.e., I/F 136) via a network 120 (e.g., a TCP/IP network such as the Internet). Printing system 100 further includes printer 142 and printer 144. These printers each print incoming print jobs onto print media 143 in accordance with instructions from print server 130. The print media may be continuous form paper, cut sheet paper, and/or any other medium suitable for printing.

In this embodiment, print server 130 includes memory 132, which stores print data for print jobs. The print data may comprise rasterized print data, Page Description Language (PDL) print data, or any other suitable format describing how to mark physical print media. Print server 130 further comprises controller 134. Controller 134 manages the operations of print server 130 in receiving, storing, and processing incoming print jobs. Controller 134 may generate reports 150 indicating color compatibility between printers and incoming print jobs. Controller 134 may be implemented as custom circuitry, as a hardware processor executing programmed instructions, etc. In one embodiment, print server 130 or the elements of print server 130 may be included in printer 142.

Upon receiving a print job, controller 134 may review a job ticket or may analyze PDL print data for the print job in order to determine a color space that is explicitly defined for the print job. For example, a header for a Portable Document Format (PDF) print job may identify a color space (e.g., GRACoL, SWOP, FOGRA, etc.) for the print job by name. The print job color space may be known as a color working space which is a standardized color space used for editing or creating the document. Each color space corresponds with a specific predefined range of colors (e.g., along axes for R, G, B, axes for C, M, Y, K, or other axes), and the range of colors encompassed by different color spaces may vary wildly. Furthermore, different color spaces may use different numbers of bits to describe each potential value for a color.

Figure 2:
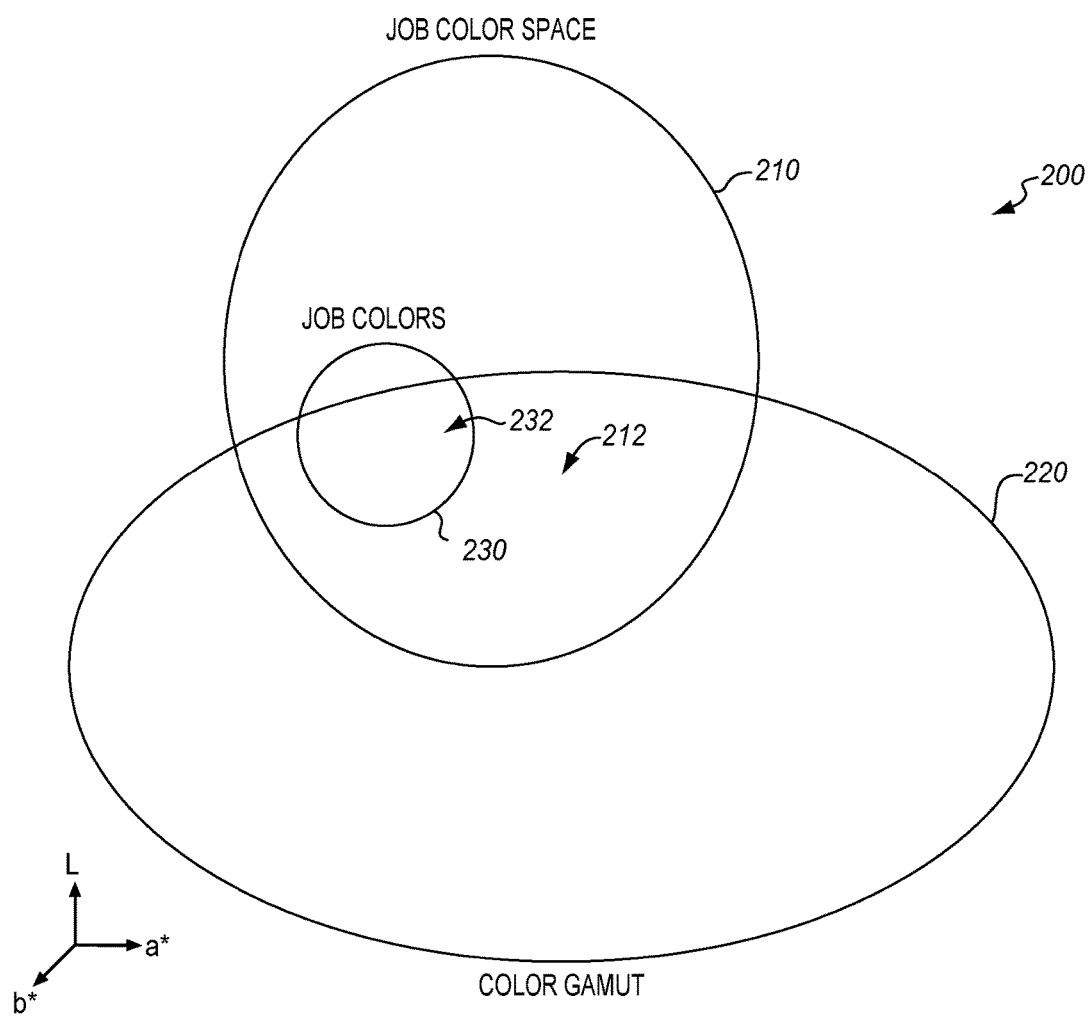
FIG. 2 is a Venn diagram illustrating intersecting ranges of colors in a perceptual color space in an illustrative embodiment.

Controller 134 may compare the color space indicated by a print job to a list of color spaces supported by printer 142 and/or printer 144. If a printer is described as supporting the color space, then controller 134 determines that the printer can reproduce each color in that color space accurately. However, even if a printer is not listed as supporting the color space indicated by a print job, there is a chance that the printer is still capable of accurately reproducing a desired amount of colors used by the print job. FIG. 2 below illustrates concepts relating to this process.

FIG. 2 is a Venn diagram 200 illustrating intersecting ranges of colors in a perceptual color space in an illustrative embodiment. The ranges of colors are compared in a perceptual Lab color space having axes for L, a*, and b*. According to Venn diagram 200, an incoming job may be defined in a job color space 210, while the color capabilities of a printer may be represented by a color gamut 220. Job color space 210 includes each color that could possibly be produced by its coordinate system. Meanwhile, color gamut 220 includes each color that could possibly be reproduced by a given printer (e.g., depending on printer settings). Printer settings may include any one or combination of ink types, print media types, tone curve adjustments and dot gain adjustments that are loaded or available at printer 142).

In this embodiment, color gamut 220 does not include the entirety of job color space 210, but rather intersects with only a portion 212 of job color space 210. Hence, the printer having color gamut 220 would not normally be considered capable of printing incoming jobs defined in job color space 210. However, while a print job may be defined in job color space 210, the job might not actually use each and every color defined in job color space 210. Indeed, it is unlikely for most print jobs to use every color that could possibly be defined by the color spaces that they refer to. Thus, job colors 230 (i.e., the colors actually used by the print job) comprise a subset of job color space 210. An amount 232 of job colors 230 may be within the bounds of color gamut 220, and hence be reproducible by the printer. If this amount 232 comprises a suitable number of job colors 230 (e.g., ninety percent of the colors called out by the print job, one hundred percent of the colors, etc.), then it may be possible to print the print job at the printer, even though color gamut 220 does not encompass job color space 210.

The particular arrangement, number, and configuration of components described herein is illustrative and non-limiting. Illustrative details of the operation of printing system 100 will be discussed with regard to FIG. 3. Assume, for this embodiment, that a client 110 has transmitted a print job 112 for printing by print server 130, and that job colors 230 of the print job 112 are defined in a job color space 210.

Figure 3:
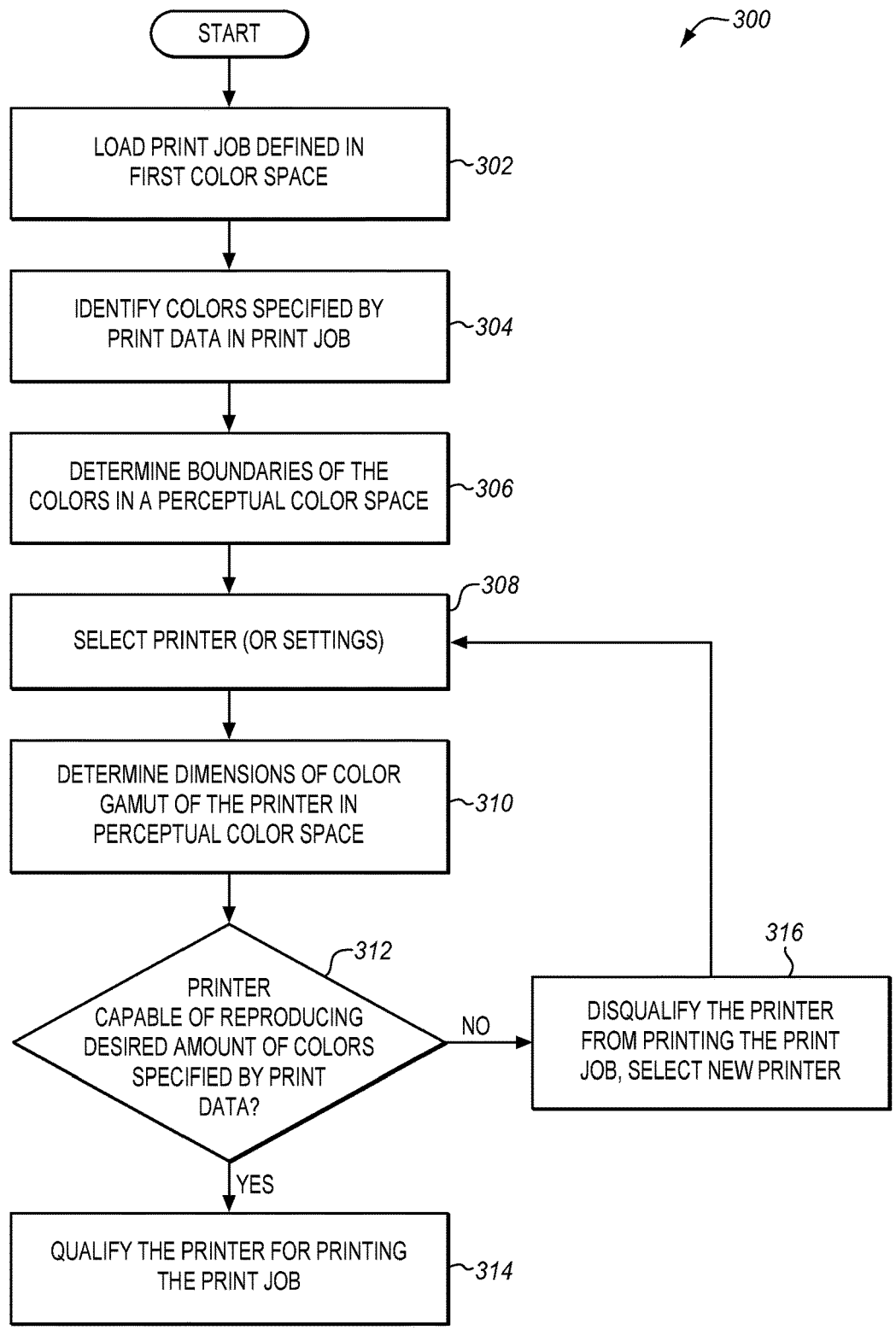
FIG. 3 is a flowchart illustrating a method for operating a printing system to selectively qualify a printer for printing an incoming job in an illustrative embodiment.

FIG. 3 is a flowchart illustrating a method 300 method for operating a printing system to selectively qualify a printer for printing an incoming print job in an illustrative embodiment. The steps of method 300 are described with reference to printing system 100 of FIG. 1, but those skilled in the art will appreciate that method 300 may be performed in other systems. The steps of the flowcharts described herein are not all inclusive and may include other steps not shown. The steps described herein may also be performed in an alternative order.

In step 302, controller 134 loads the print job 112 defined in the job color space 210. This may comprise loading all or a portion of print data for the job into Random Access Memory (RAM) for review. In step 304, controller 134 identifies colors specified by print data within the print job. For example, controller 134 may rasterize an incoming print job into a Tagged Image File Format (TIFF) image, identify individual pixels in the image, and extract individual CMYK or RGB color values for identified pixels in the TIFF image. In a further example, controller 134 identifies specific colors called out by PDL print data within the print job as job colors 230. If the print job includes images that have not been rasterized, controller 134 may process each image to determine specific colors utilized by that image. Depending on the file format of the image, this may involve consulting an index of colors included with the image, or may even involve rasterizing the image and then identifying the colors of individual pixels within the image. Controller 134 may continue to update a color table for the print job as new colors (i.e., colors that are distinct/unique from colors that are already in the color table) are identified. For example controller 134 may update a Committee for Graphic Arts Technologies Standards (CGATS) color table.

In step 306, controller 134 further determines coordinates of the job colors 230 in a perceptual color space, such as CIE LAB. A perceptual color space is a color space which is perceptually uniform. A color space is perceptually uniform when changes of the same amount/distance in a color value produce a change of about the same visual importance to a viewer. Example implementations of perceptual color spaces include the Lab color space, the CIE L*a*b* 1976 color space, any color space that utilizes the CIE 1994 color difference, and any color space that utilizes the CIE 2000 color difference. Controller 134 may utilize a pre-existing conversion system or formula for converting the coordinates of the colors to the perceptual color space.

Controller 134 also selects a candidate printer 142 and/or collection of printer settings for that printer (e.g., a set of inks, paper, etc. at the printer) (step 308). In this example, data stored in memory 132 for printer 142 indicates that printer 142 does not support the job color space. Thus, printer 142 is not capable of reproducing the entire range of colors in the job color space. Printer 144 is capable of reproducing the entire range of colors in the job color space, but is more expensive to operate than printer 142. Thus, controller 134 attempts to determine if printer 142 would be capable of reproducing a sufficient amount of colors from the print job to meet with customer expectations of quality for the print job. With printer 142 selected, controller 134 determines boundaries of a color gamut 220 of printer 142 in the perceptual color space (step 310) through known methods. These boundaries may be defined as boundaries or extents of the color gamut in the perceptual color space, such that the color gamut is defined as a specific shape within the perceptual color space. Alternatively, the boundaries may be defined as a series of specific individual coordinates within the perceptual color space. Alternatively, determining the boundaries of color gamut 220 may include loading color gamut 220 data from memory 132.

With the coordinates of the colors of the print job in the perceptual color space known, and the boundaries of the color gamut of printer 142 known, controller 134 determines whether printer 142 is capable of reproducing a desired amount of colors specified by the print data for the print job (also referred to herein as "job colors") (step 312). This process involves comparing the job colors and the color gamut in the perceptual color space, to determine which specific job colors printer 142 is capable of reproducing. The desired amount of job colors may comprise a percentage (e.g., between eighty and ninety percent) of the total colors within the print job, a percentage of the pixels within the print job, etc. In further embodiments, controller 134 may filter out outlier colors from the analysis, such as colors that do not use more than a certain percentage of pixels of the print job.

Controller 134 may further generate reports that indicate a percentage of job colors that are within the color gamut of printer 142, a percentage of pixels of the print job that are in or out of the color gamut of printer 142, a histogram of colors that are outside of the color gamut of printer 142, and/or perceptual distances indicating how far each job color is from the color gamut of printer 142. For example, controller 134 may provide a report that overlays job colors onto the color gamut of the printer in a 3D Lab color space. This information can help to indicate whether printer 142 could be reconfigured to properly print the print job, by changing the printer settings (e.g. paper types and/or ink types loaded or available at printer 142). Different reports may be generated for different printer settings of printer 142.

If printer 142 is capable of reproducing the desired amount of job colors, then it qualifies printer 142 for printing the print job (step 314). In one embodiment, this may comprise controller 134 transmitting the print job to printer 142 for printing. Alternatively, if printer 142 is incapable of reproducing the desired amount of the job colors, then controller 134 disqualifies printer 142 from printing the print job, and may select a new printer for analysis (step 316). For example, controller 134 may refrain from transmitting the print job to printer 142, or if the print job is already queued for printing at printer 142, controller 134 may cancel the print job from printing at printer 142. Controller 134 may further queue the print job at printer 144 if controller 134 determines printer 144 is qualified. In another embodiment, controller 143 identifies qualified and/or unqualified printers in the report. Controller 143 may the transmit the report data to a display device (e.g. for display on a screen or for printing on a printer) and/or to client 110.

Method 300 provides a substantial benefit over prior techniques, because it enables printers to be qualified or disqualified from printing jobs based on their ability to reproduce specific colors defined within the print data for those jobs. This enables some print jobs defined in exotic color spaces to be printed at printers that do not support the entire color space.

Figure 4:
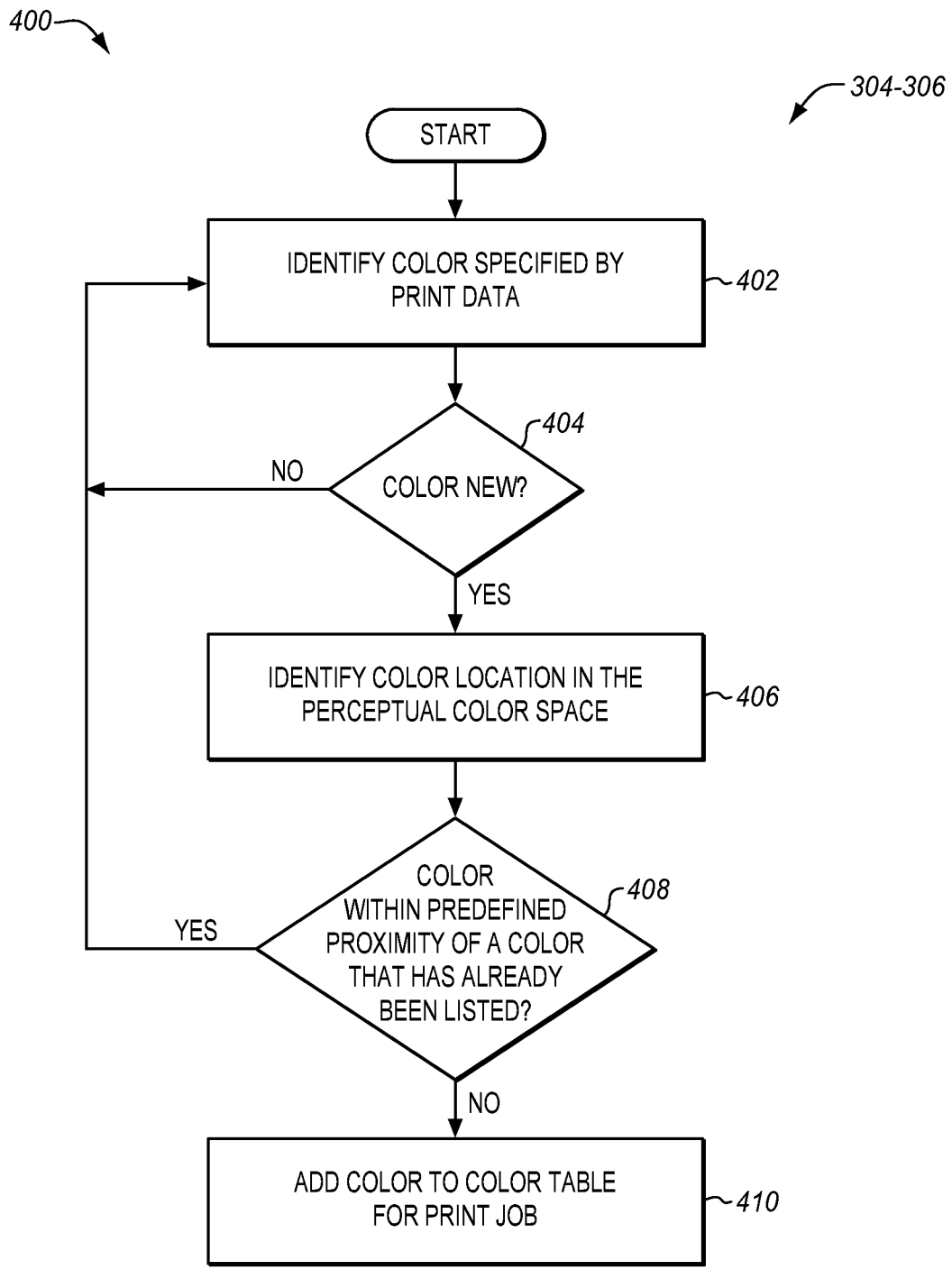
FIG. 4 is a flowchart illustrating a method for determining colors used in a print job in an illustrative embodiment.

FIG. 4 is a flowchart illustrating a method 400 for determining colors used by a print job in an illustrative embodiment. Specifically, method 400 illustrates a process for performing steps 304-306 of FIG. 3. In this embodiment, controller 134 identifies a color specified by print data within the print job (step 402). The color may be identified by a set of coordinates within the color space of the print job. With the color identified, controller 134 determines whether or not the color qualifies as a new color (step 404). In this embodiment, a "new" color is any color that has not yet been encountered by controller 134 during analysis of the print job. For example a new color may be any color represented by a new set of coordinates in the color space of the job.

If the color is not new, controller 134 may update a pixel count (or pixel ratio statistic indicating a percentage of pixels of the job) for that color in a color table, and return to step 402 to identify a next color identified in the print data for the job. Alternatively, if the color is new, controller 134 proceeds to step 406. In steps 406-408, controller 134 determines whether the new color is perceptually close (e.g. perceptually indistinguishable from) a color already listed in a color table for the print job. Thus, controller 134 identifies a location of the new color in the perceptual color space (step 406). Controller 134 further determines whether the new color is within a predefined proximity (in the perceptual color space) of a previously processed color that has already been listed in a color table for the print job (step 408). The predefined proximity may comprise a CIE76 $\Delta E^*$ value of $\pi$, a CIEDE2000 $\Delta E^*$ value of 3, etc.

If the new color is within the predefined proximity of a color already listed for the print job, then the colors are perceptually similar enough that the new color need not be separately compared against the color gamut of the printer. The color may thus be discarded/ignored, and processing returns to step 402. Alternatively, if the new color is not within the predefined proximity (in the perceptual color space) of an existing color, then the new color is sufficiently perceptually distinct that it should be checked against the color gamut of the printer. Thus, in step 410 controller 134 proceeds to add the new color to the color table for the print job.

In further embodiments, controller 134 may utilize a clustering algorithm to identify groups of new colors that are within the predefined proximity of each other in the perceptual color space. Controller 134 may then identify a centroid of each "cluster" of colors that are within the predefined proximity, and compare these centroids to the color gamut of the printer. If the printer is incapable of reproducing the centroid of a "cluster" of colors that includes a larger number of job colors (or pixels for the job), that impact may be weighted more heavily than for "clusters" that include a smaller number of job colors (or pixels for the job). Some implementations of clustering algorithms may additionally include sensitivity parameters for ranges of colors that indicate how sensitive humans are to changes in color, such as hue angle dependencies, for example.

Figure 5:
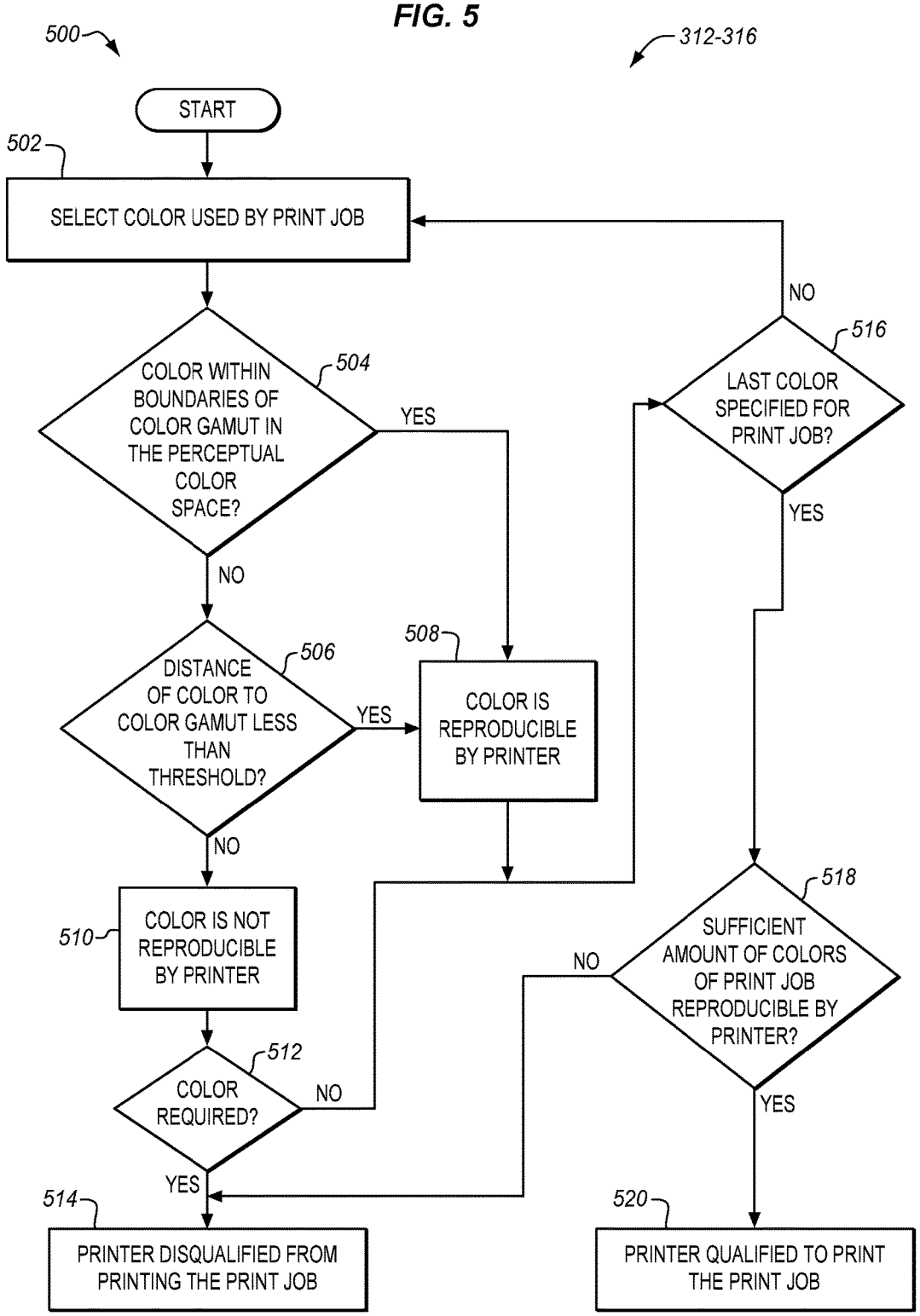
FIG. 5 is a flowchart illustrating a method for determining an amount of colors in a print job that are reproducible by a printer in an illustrative embodiment.

FIG. 5 is a flowchart illustrating a method 500 for determining an amount of colors in a print job that are reproducible by a printer in an illustrative embodiment. That is, method 500 illustrates operations that may be performed when engaging in steps 312-316 of method 300.

According to method 500, controller 134 selects a color defined by print data for the print job (step 502). For example, controller 134 may select a next color from a color table generated in steps 304-306 of method 300. With the color selected, controller 134 determines whether the color is within the boundaries of the color gamut of printer 142 in the perceptual color space (step 504). If the color is within the color gamut of the printer, then the color is reproducible by printer 142 (step 508), and processing continues to step 516. Alternatively, if the color is not within the color gamut of printer 142, then processing continues to step 506, wherein controller 134 determines a distance of the color to a boundary of color gamut of printer 142 in the perceptual color space. In such an embodiment, a distance between a color and the color gamut may be the shortest distance between the coordinate of the color in the perceptual color space and a boundary of the color gamut in the perceptual color space. Distance in the perceptual color space may be defined by a variety of metrics. For example, distance may be defined as color differences based on a Delta E ($\Delta E^*$) value according to CIE76, CIE 94, or CIE2000 standards. The threshold distance may comprise a CIE76 $\Delta E^*$ value of $\pi$, a CIE2000 $\Delta E^*$ value of 3, etc.

If the color is within the threshold distance of a boundary of color gamut 220 in the perceptual color space, then the color is sufficiently perceptually close to a color that the printer is capable of reproducing. Hence, the color from the print job is considered to be reproducible by the printer (step 508), and processing continues to step 516. Alternatively, if the color is more than the threshold distance away from the color gamut of the printer, then in step 510 controller 134 flags the color as not being reproducible by the printer. Controller 134 further determines whether the color that is not reproducible is required. This may be particularly relevant when a print job includes colors that must be reproduced exactly, such as colors used within a corporate logo, "spot" colors, etc. If the color is required, then printer 134 is disqualified from printing the print job in step 514. Alternatively, if the color is not required, then in step 516, controller 134 determines whether the color was the last color specified in the print data for the print job. If the color was not the last color for the print job, then processing continues to step 502 and a new color is selected.

Alternatively, if the color was the last color specified for the print job, then controller 134 determines whether a sufficient amount of colors specified in the print data for the job is reproducible by printer 142 in step 518. This may be performed by determining the absolute number of colors in a color table for the print job that are reproducible, determining a percentage of colors in a color table for the print job that are reproducible, determining a percentage of pixels for the print job that are reproducible, etc. If a sufficient amount of colors for the print job is reproducible by printer 142, then controller 134 qualifies printer 142 for printing the print job in step 520. Alternatively, if an insufficient amount of colors for the print job are reproducible by printer 142, then controller 514 disqualifies printer 142 from printing the print job in step 514.

Figure 6:
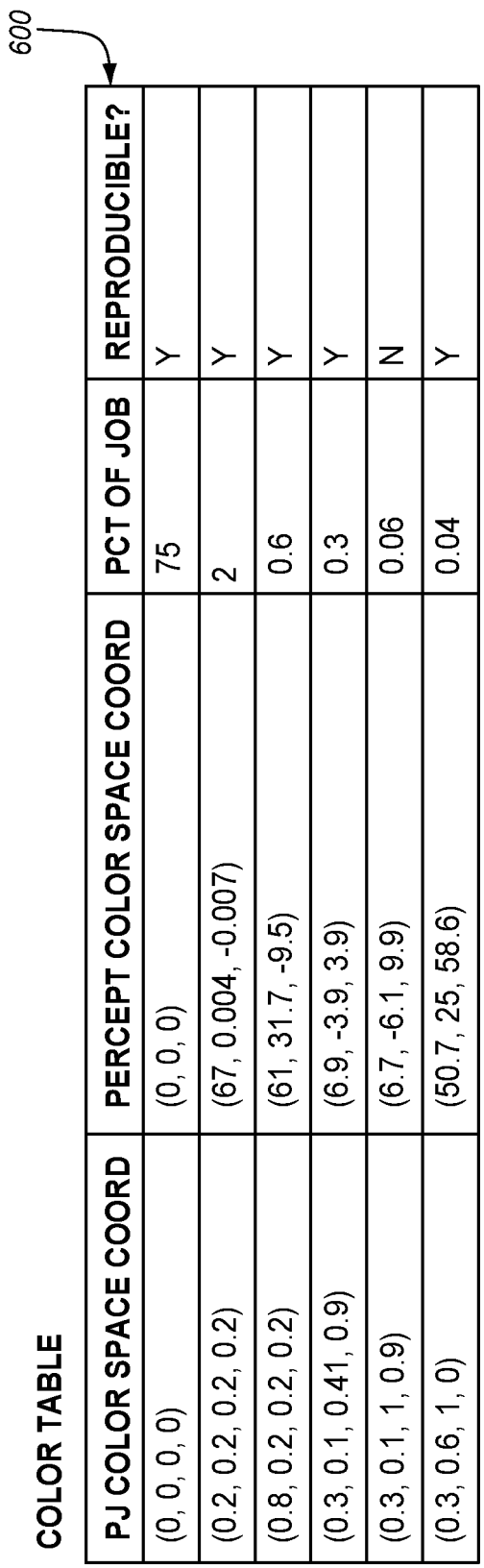
FIG. 6 is a table illustrating a list of colors in an illustrative embodiment.

FIG. 6 is a table 600 illustrating a list of colors in an illustrative embodiment. For example, table 600 may represent a color list generated by controller 134 when analyzing a print job. As shown in FIG. 6, table 600 includes a list of coordinates in a color space of the print job. Each coordinate represents a different color. Table 600 also includes a perceptual color space coordinate for each color, and a column indicating a percentage of pixels of the print job that use the color. The percentage value for each color may be updated by controller 134 as the print job continues to be analyzed. A column included in table 600 also indicates whether or not each color is reproducible by a given printer. Using table 600, controller 134 may quickly report the number and/or percentage of pixels and/or colors that are reproducible by a given printer.

In further embodiments, table 600 may include columns that indicate the number of pixels used by each color, a number of colors within the printer that are within a predefined proximity of that color, and/or other information desired. Table 600 may be embodied in memory 132. Controller 134 may include table 600 in generated reports.

Figure 7:
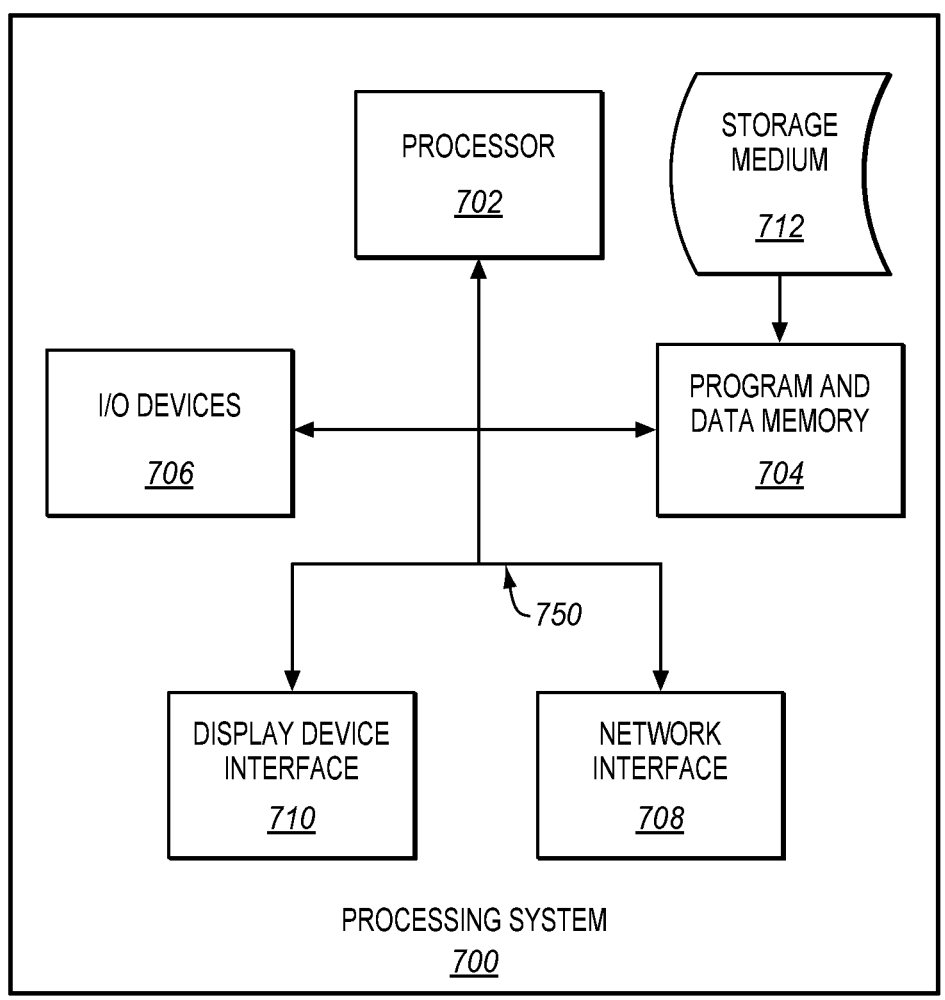
FIG. 7 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of controller 134 to perform the various operations disclosed herein. FIG. 7 illustrates a processing system 700 operable to execute a computer readable medium embodying programmed instructions to perform desired functions in an illustrative embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

What is claimed is:

1. A system comprising:
   an interface;
   a memory storing a print job defined in a job color space; and
   a controller that is configured to identify colors specified by print data in the print job, determine coordinates of the colors in a perceptual color space, select a printer, determine boundaries of a color gamut of the printer that together define a shape in the perceptual color space, and determine an amount of the colors that the printer is capable of reproducing based on whether the colors are within the boundaries of the shape,
   when the amount is greater than a threshold, the controller is configured to qualify the printer for printing the print job,
   when the amount is less than the threshold, the controller is configured to disqualify the printer from printing the print job,
   wherein the controller is configured to discard colors that are within a predefined proximity of a previously processed color in the perceptual color space, prior to determining the amount of the colors that the printer is capable of reproducing, such that the discarded colors are not considered when determining the amount of colors that the printer is capable of reproducing.

2. The system of claim 1 wherein:
   the controller is configured to determine the amount of the colors that the printer is capable of reproducing by identifying distances between the colors and the color gamut in the perceptual color space, and determining whether each of the distances is less than a threshold distance.

3. The system of claim 1 wherein:
   the amount of the colors comprises a percentage of the colors.

4. The system of claim 1 wherein:
   the amount of the colors comprises a percentage of pixels in the print job.

5. The system of claim 1 wherein:
   the controller is configured to identify colors specified by the print data by rasterizing images within the print job, and identify pixels of the images that use different colors.

6. The system of claim 1 wherein:
   the controller is configured to identify colors specified by the print data by analyzing Page Description Language (PDL) data within the print job.

7. The system of claim 1 further comprising:
   the printer, wherein the printer is configured to print the print job onto a print media in response to being qualified for printing the print job.

8. The system of claim 1 wherein:
   the perceptual color space comprises a CIE LAB color space.

9. A method comprising:
   loading a print job defined in a job color space;
   identifying colors specified by print data in the print job;
   determining coordinates of the colors in a perceptual color space;
   selecting a printer;
   determining boundaries of a color gamut of the printer that together define a shape in the perceptual color space;
   determining an amount of the colors that the printer is capable of reproducing based on whether the colors are within the boundaries of the shape;
   determining whether the amount is greater than the threshold;
   when the amount is greater than a threshold, qualifying the printer for printing the print job;
   when the amount is less than the threshold, disqualifying the printer from printing the print job; and
   discarding colors that are within a predefined proximity of a previously processed color in the perceptual color space, prior to determining the amount of the colors that the printer is capable of reproducing, such that the discarded colors are not considered when determining the amount of colors that the printer is capable of reproducing.

10. The method of claim 9 wherein:
    determining the amount of the colors that the printer is capable of reproducing comprises:
    identifying distances between the colors and the color gamut in the perceptual color space; and
    determining whether each of the distances is less than a threshold distance.

11. The method of claim 9 wherein:
    the amount of the colors comprises a percentage of the colors.

12. The method of claim 9 wherein:
    the amount of the colors comprises a percentage of pixels in the print job.

13. The method of claim 9 wherein:
    identifying colors specified by the print data comprises:
    rasterizing images within the print job; and
    identifying pixels of the images that use different colors.

14. The method of claim 9 wherein:
    identifying unique colors specified by the print data comprises:
    analyzing Page Description Language (PDL) data within the print job.

15. The method of claim 9 wherein:
    the perceptual color space comprises a CIE LAB color space.

16. A non-transitory computer readable medium embodying programmed instructions which, when executed by a processor, are operable for performing a method comprising:
    loading a print job defined in a job color space;
    identifying colors specified by print data in the print job;

determining coordinates of the colors in a perceptual color space;
selecting a printer;
determining boundaries of a color gamut of the printer that together define a shape in the perceptual color space;
determining an amount of the colors that the printer is capable of reproducing based on whether the colors are within the boundaries of the shape;
determining whether the amount is less than the threshold;
when the amount is less than a threshold, qualifying the printer for printing the print job;
when the amount is greater than the threshold, disqualifying the printer from printing the print job; and
discarding colors that are within a predefined proximity of each other in the perceptual color space, prior to determining the amount of the colors that the printer is capable of reproducing, such that the discarded colors are not considered when determining the amount of colors that the printer is capable of reproducing.

17. The medium of claim 16 wherein:
determining the amount of the colors that the printer is capable of reproducing comprises:
identifying distances between the colors and the color gamut in the perceptual color space; and
determining whether each of the distances is less than a threshold distance.

* * * * *